United States Patent [19]
Hoffman et al.
[11] 3,955,044
[45] May 4, 1976

[54] CORROSION PROOF TERMINAL FOR ALUMINUM WIRE

[75] Inventors: Ronald Clarence Hoffman, Williamstown; Timothy Allen Lemke, Mechanicsburg; Robert Charles Swengel, Sr., York, all of Pa.

[73] Assignee: AMP Incorporated, Harrisburg, Pa.

[22] Filed: Dec. 3, 1970

[21] Appl. No.: 94,653

[52] U.S. Cl. .......... 174/84 C; 29/628; 174/90; 339/95 R; 339/223 R; 339/276 T
[51] Int. Cl.[2] .......... H02G 15/08
[58] Field of Search .......... 174/84 C, 90, 94 R; 339/223 R, 276 R, 276 T; 29/628, 629, 630 F, 470.1, 407; 72/410

[56] References Cited

UNITED STATES PATENTS

| | | | |
|---|---|---|---|
| 2,109,837 | 3/1938 | Davis | 339/276 R X |
| 2,251,189 | 7/1941 | Jensen | 174/94 R UX |
| 2,327,650 | 8/1943 | Klein | 174/94 R UX |
| 2,533,200 | 12/1950 | Rogoff | 339/223 R |
| 2,681,439 | 6/1954 | Carlson | 339/276 T X |
| 2,692,422 | 10/1954 | Pierce | 174/90 UX |
| 2,806,215 | 9/1957 | Redslob | 174/84 C UX |
| 2,810,897 | 10/1957 | Shinske | 174/94 R UX |

FOREIGN PATENTS OR APPLICATIONS

| | | | |
|---|---|---|---|
| 258,980 | 1/1964 | Australia | 339/276 T |

OTHER PUBLICATIONS

Aluminum Joining Processes for the Electrical Industry, "Compression Connectors," Ref. Code: C, p. 8, Copyright 1968, by Aluminum Company of America, Pittsburgh, Pa. 15219.

*Primary Examiner*—Harold Broome
*Attorney, Agent, or Firm*—Gerald K. Kita

[57] ABSTRACT

A crimped corrosion proof terminal for crimping onto solid or stranded aluminum wire is disclosed. The pre-crimped combination includes a tubular, plated copper terminal, the forward portion of which is flattened and closed and the rearward portion houses a perforated insert. The rearward portion of the terminal carries an insulation sleeve disposed on a metallic ferrule. The rearward portion of the ferrule houses a bushing. This assembly is crimped such that the resulting crimped terminal and wire are progressively reduced in diameter in a stepwise fashion, a forward deeply crimped portion elongates and is provided with a reservoir which substantially fills with extruded wire.

The forward portion of the termination incurs the greatest reduction and the rearward portion the least. The crimping causes the aluminum wire to extrude through the perforations in the insert, thereby establishing good electrical contact between the wire and the terminal by breaking the aluminum oxide film on the aluminum wire. Longitudinal stress is developed at the interface of the extruded aluminum and the walls of the perforations which substantially prohibits longitudinal creep of the aluminum. The crimping also causes stranded aluminum wire to cold weld creating interstrand contact at the forward portion of the terminal where the greatest reduction in diameter takes place.

The crimped termination is closed in the forward portion and sealed in the rearward portion by the bushing to provide protection from harsh environments by eliminating electrolytic corrosion.

21 Claims, 17 Drawing Figures

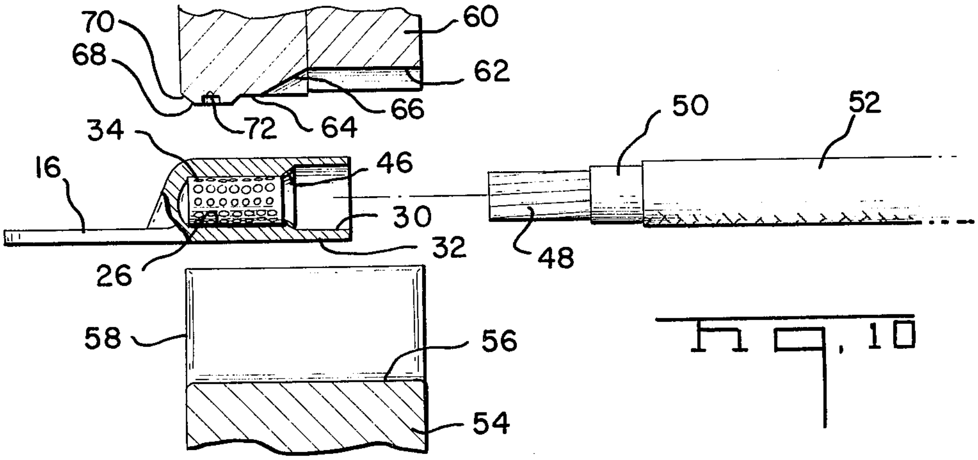
Fig. 10
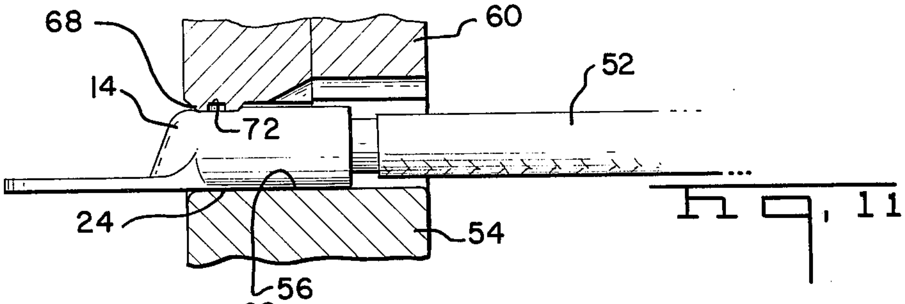
Fig. 11
Fig. 12
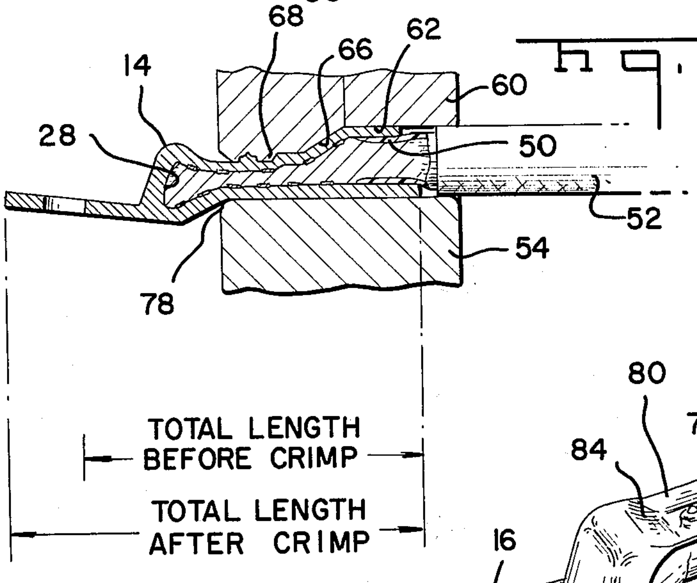
Fig. 13
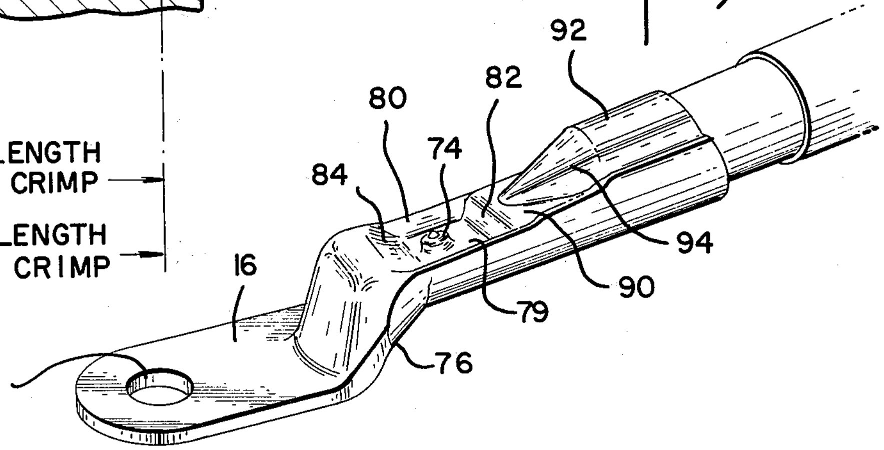

CORROSION PROOF TERMINAL FOR ALUMINUM WIRE

CROSS REFERENCE TO RELATED APPLICATION

This application relates to application Ser. No. 888,134, filed Dec. 29, 1969, which is in turn a continuation of Ser. No. 667,386, filed Sept. 13, 1967.

BACKGROUND OF THE INVENTION

This invention relates to corrosion proof terminals for solid or stranded aluminum wire.

The problems associated with copper-aluminum terminations have long been recognized. Aluminum, upon exposure to air, forms a non-conductive, mechanically hard outer layer of aluminum oxide. The formation of the oxide layer is self-limiting. Thus, unlike the ferrous metals, progressive corrosion of the aluminum does not occur. The non-conductive nature of the oxide layer prohibits electrical conductance even when seemingly intimate contact has been established. A standard method of overcoming this non-conductance is to place a grease-abrasive mixture in intimate contact with the aluminum. When the terminal is crimped, the abrasive material cuts through the oxide film establishing contact. The grease prevents reoxidation. This method is undesirable in oil-filled transformers when the grease and abrasive may contaminate the oil. With stranded aluminum wire such a method does not insure good interstrand contact.

Other solutions to the oxide problem are tin and copper clad aluminum wire. A good contact material is plated or clad directly onto the wire, thereby by-passing the oxide formation. Such wire is expensive.

Creep or cold flow is another problem associated with aluminum. Aluminum has no ultimate rigidity. Thus, it will deform away from applied stress. The rate of creep increases with temperature. In a pressure connection the creep away from the stressed area causes high resistance and heating. The heating causes acceleration of the creep. The final result is failure of the joint.

The creep problem has been overcome by maintaining a constant stress on the joint by residual pressure. This has been done with spring washers in bolted connections and with a C-member having spring characteristics. The residual pressure in the C-member tends to follow-up on the wire as it creeps, thereby maintaining a continuous stress on the contact area. In crimped connections, the creep problem is minimized by completely confining the wire material in the wire barrel.

Electrolytic or galvanic corrosion is another problem with copper-aluminum terminations. Since the electrical potentials of the two metals differ significantly, exposure to moisture containing an electrolyte establishes a galvanic cell with resulting current flow and ion exchange. Plating of copper with a metal having an electrolytic potential more similar to aluminum reduces the effect of the electrolytic action. Grease compounds also provide protection by preventing the corrosion media from contacting the coupled materials. The most effective way of removing electrolytic corrosion is to isolate the termination from the environment. This may be achieved by insulating the termination.

SUMMARY OF THE INVENTION

The referred to applications provide an improved crimpable corrosion proof terminal for stranded or solid aluminum wire. The precrimped combination consists of a tubular, plated copper terminal, the forward portion of which is flattened and closed and the rearward portion of which is tubular. The plating metal may be any metal with an electrolytic potential between −0.20v and −1.50v. The preferred plating metal is one having an electrolytic potential close to that of aluminum or −0.85v. Metals in the above mentioned range decrease galvanic corrosion which occurs when a electrolytic solution comes in contact with a bare copper-aluminum interface. Copper-aluminum cells have a potential difference of 0.65v, aluminum having a potential of −0.85v and copper −0.20v.

A perforated conductive insert is placed in the rearward portion of the tubular terminal. The insert material should have a tensile strength greater than or equal to that of the aluminum wire so that extrusion of the aluminum through the perforations may occur thereby breaking the aluminum oxide layer which forms on the surface of the aluminum wire. The tubular portion of the terminal is enclosed in the forward portion of a metallic ferrule. The rearward portion of the ferrule has a greater diameter than the forward portion and into this rearward portion is inserted a sealing bushing.

Either stranded or solid aluminum wire is inserted into the above described assembly and the combination is crimped. The crimped termination is one which is progressively reduced in diameter, the forward portion undergoing the greatest reduction, the rearward portion the least. The rearward crimped portion is circular. The forward crimped portion is hemispherical. The forward portion of the crimped termination includes substantially all of the perforated insert. When this portion is crimped, the aluminum extrudes up through the perforations, breaking the oxide layer on the aluminum and giving good electrical contact. Further in the case of stranded aluminum wire, the crimping causes interstrand contact by cold welding the strands, thereby breaking the aluminum oxide layer. The hemispherical crimp causes the interstrand movement, which is necessary to create the cold welding.

Longitudinal stress is developed at the interface of the extruded aluminum and the walls of the perforations such that longitudinal creep is minimized.

The progressively decreased deformation eliminates wire breakage which would otherwise occur if the wire is not supported via a less deformed area immediately after the maximum deformation crimp. The longer terminal also decreases the creep.

The extruded aluminum is in intimate contact with the perforated insert thereby preventing reoxidation and maintaining good contact. Since the terminal is sealed, environmental electrolytic corrosion is eliminated. This result may be assured by insulating the termination with, for example, heat shrinkable tubing.

BRIEF DESCRIPTION OF THE DRAWINGS

In the drawings:

FIG. 10 is a fragmentary elevation illustrating the preferred embodiment of FIG. 7 in partial exploded configuration and a pair of cooperating crimping dies partially in section illustrating a crimping operation according to the present invention;

FIG. 11 is a fragmentary elevation partially in section illustrating the preferred embodiment of FIG. 7 in fully assembled condition and with the crimping dies illustrated in FIG. 10 in cooperating relationship during crimping;

FIG. 12 is a fragmentary elevation partially in section of the structure shown in FIG. 11, but with the crimping dies in cooperating relationship upon completion of a crimping operation according to the present invention;

FIG. 13 is a enlarged fragmentary perspective of an electrical termination resulting from the crimping operation illustrated in FIGS. 10, 11 and 12;

DETAILED DESCRIPTION OF THE PRIOR ART

Figures 1, 2, 3, 4, 5, 6:
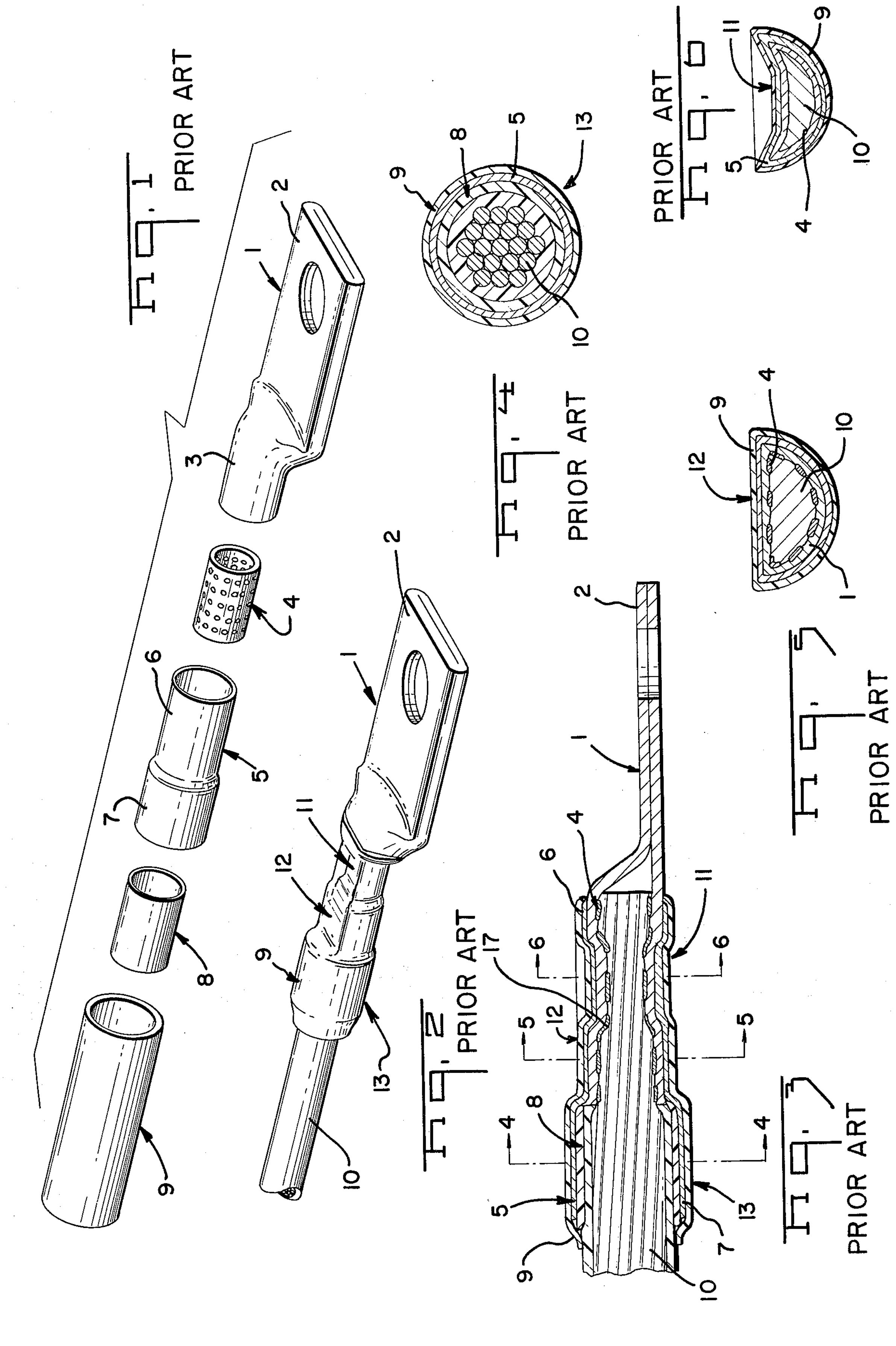
Fig. 1 PRIOR ART
Fig. 2 PRIOR ART
Fig. 3 PRIOR ART
Fig. 4 PRIOR ART
Fig. 5 PRIOR ART
Fig. 6 PRIOR ART
FIG. 1 is an exploded perspective view of the elements of the a prior art terminal to which this invention has application.
FIG. 2 is a perspective view of the terminal of FIG. 1 crimped onto an aluminum conductor.
FIG. 3 is a cross-sectional view of the crimped prior art termination.
FIG. 4 is a view taken along lines 4—4 of FIG. 3.
FIG. 5 is a view taken along lines 5—5 of FIG. 3.
FIG. 6 is a view taken along lines 6—6 of FIG. 3.

FIG. 1 shows the elements of a prior art terminal prior to assembly and crimping, to which the present invention has application. Plated copper terminal 1 is flattened and closed at its forward portion 2 and tubular in its rearward portion 3. Forward portion 2 defines a portion for engagement with a conductive member. The plating material may be any metal with an electrolytic potential between −.20v and −1.50v. A simple copper-aluminum termination upon exposure to moisture containing an electrolyte will create a galvanic cell resulting in decomposition of the materials. The rate of decomposition is directly related to the potential difference. Aluminum has a potential of −0.85v and copper a potential of −0.20v. The potential difference is 0.65v. Thus, any metal which results in a potential difference less than 0.65v when in contact with aluminum will serve as a plating material. Tin is the preferred material.

Perforated insert 4 is housed in the inner end of tubular portion 3 of terminal 1. The insert may be of any conductive material with a tensile strength greater than the aluminum wire. This is necessary so that upon deformation the material of the insert will cause the aluminum to extrude through the perforations so that the non-conductive aluminum oxide layer will be broken allowing intimate contact between the aluminum and the terminal. Insert 4 is preferable made of tin plated brass.

The forward portion 6 of metallic ferrule 5 houses the tubular portion 3 of terminal 1. The rearward portion 7 of ferrule 5 is of greater diameter than forward portion 6 and houses sealing bushing 8 which has an inside diameter corresponding substantially to that of forward portion 6. The bushing may be any plastic material. Insulation 9 houses the crimped termination and provides insulation therefor.

FIG. 3 shows a cross-section of the crimped termination. Solid or stranded aluminum wire 10 is inserted into the termination assembly and crimped by crimping dies (not shown). Crimped portion 11 undergoes the greatest deformation or reduction. FIG. 6 indicates the hemispherical shape of the crimp. Upon crimping, aluminum wire 10 extrudes through the perforations of insert 4. The extrusion process breaks the layer of aluminum oxide thereby establishing electrical continuity between the terminal and the wire. The intimate contact established between terminal 3, insert 4, and wire 10 prevents reoxidation of the wire. The inner surface of the tubular portion 3 along which insert 4 extends is also extruded into the perforations of the insert.

In the case of stranded aluminum wire, the crimping causes the strands to cold weld, thereby establishing intimate interstrand contact. The hemispherical crimp causes the strands to rub against each other in a fashion which results in breakage of the aluminum oxide layer and cold welding is effected. The hemispherical configuration may be replaced by any configuration which results in interstrand movement upon crimping and the hemispherical crimp is not limiting but merely exemplary.

Because aluminum has no ultimate rigidity, longitudinal creep away from the area under stress may result in failure of the termination. The extruded aluminum prevents longitudinal creep by creating longitudinal stress at the interface of the aluminum and the walls of the perforation.

Crimped portion 12 is also deformed in a hemispherical configuration as shown in FIG. 5; however, the deformation is not as great as the deformation in crimped portion 11. Portion 13, which houses bushing 8, is circularly crimped as shown in FIG. 4. Portions 12 and 13 act as support for wire 10 and prevent breakage thereof. Without portions 12 and 13 mechanical movement of wire 10 about section 17 will result in eventual breakage of wire 10. This crimped combination may then be enclosed by insulation 9 which may be on ferrule 5 as part of the terminal assembly. Insulation 9 may be heat-shrinkable tubing or the like. The heat-shrinkable tubing is applied to the crimped area after the termination has been effected. The heat-shrinkable insulation further protects the termination from adverse environment conditions.

Sealing bushing 8 is used when insulation 9 is part of the terminal assembly, but, when heat-shrinkable insulation is used, bushing 8 need not be used. In either case, the termination is sealed because the front end of terminal 1 is closed thereby forming a sealed termination. In some cases, insulation 9 may be eliminated and only sealing bushing 8 need be used.

Alternatively in the area of greatest deformation of the crimp this area can take the form of a convexo-concave configuration.

DESCRIPTION OF THE PREFERRED EMBODIMENTS

Figure 7:
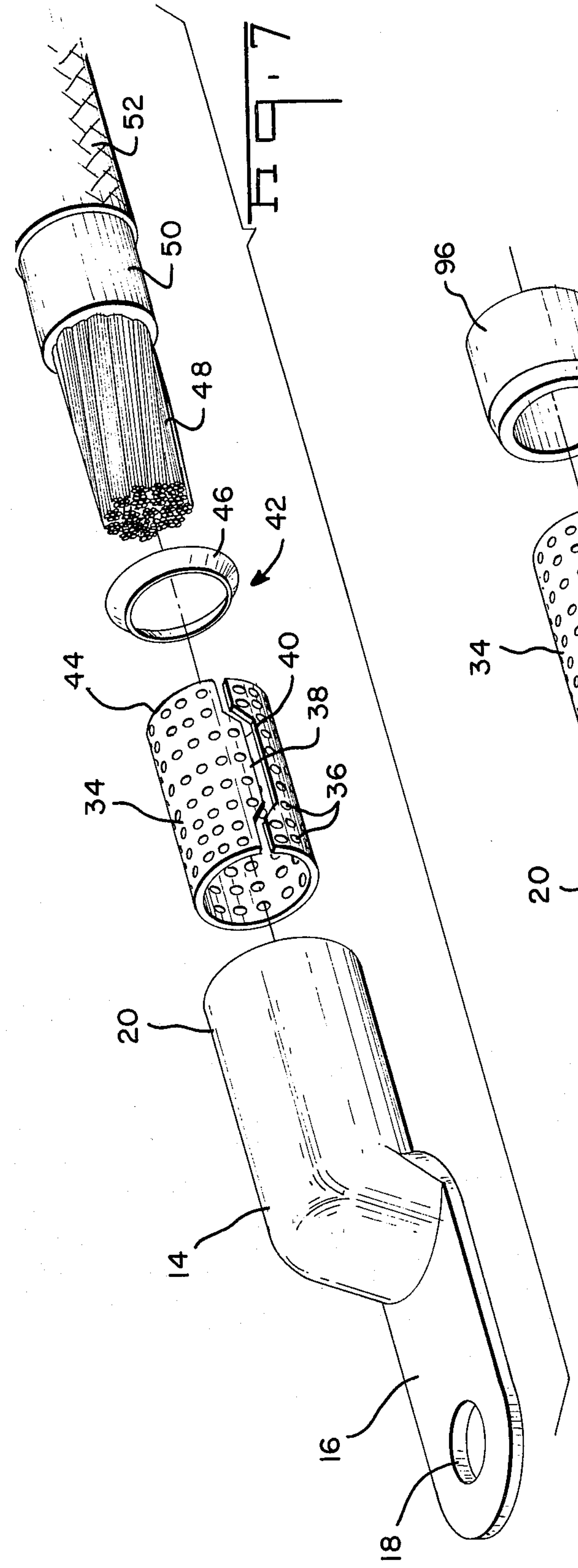
FIG. 7 is an enlarged, exploded perspective illustrating in detail a preferred embodiment according to the present invention.

With reference now being made to FIG. 7, taken in conjunction with FIGS. 8 and 9, preferred embodiments of a completely sealed termination of the present invention will be described in detail. A tin plated copper terminal 14 similar to the terminal 1, is fabricated with a solid tongue 16 similar in configuration to the flattened portion 2 of the terminal 1. The tongue 16 is provided with an aperture 18 and is integral with a sealably closed end wire barrel portion 20. The tongue 16 includes a planar surface 22 tangential to a cylindrical surface 24 of the cylindrical wire barrel 20. The cylindrical wire barrel 20 includes a first inner cylindrical portion 26, the terminal end 28 of which is not planar, as expected with a right cylindrical configuration, but is purposely formed to a convex configuration serving as a reservoir as shown in FIG. 9 for a purpose to be described hereinafter. The cylindrical inner portion 26 communicates with a relatively enlarged cylindrical inner portion 30 immediately adjacent to a terminal end 32 of the terminal 14.

As shown in FIG. 7, a perforated liner 34 of a material similar to the liner 4, includes a plurality of perforations 36. The liner 34 is generally cylindrical in configuration and is fabricated from an elongated strip which is formed into a cylindrical configuration with a tab portion 38 registering generally within a complementary shaped recess portion 40, the portions 38 and 40 provided in adjacent lateral margins of the strip. A generally annular ring 42 is provided to register against the circular end 44 of the cylindrical insert 34. The ring 42 has an inclined wall 46 giving it a tapered configuration or a funnel configuration providing a lead-in funnel surface for the multiple strands 48 of a wire conductor when inserted through the ring 46 and into the insert 34. The end portions of the strands 48 protrude from a surrounding insulation sheath 50 which is of any well known type that is impervious to moisture and other corrosion inducing environments. Such insulation sheath 50 is further covered with an abrasion resistant outer sheath 52.

As shown in FIG. 10, the perforated insert 34 is inserted in registration within the cylindrical inner portion 26 and the ring 46 registers against the end 44 of the insert 34 when placed within the cylindrical inner portion 30 of the terminal. The wire strands 48, of an aluminum conductor for example, are inserted within the terminal to lie entirely within the cylindrical insert 34, the funnel shaped ring 46 gathering the ends of the strands 48 and comprising them radially inwardly toward one another to allow insertion thereof within the insert. The exposed portion of the insulation sheath 50 registers within the inner cylindrical portion 30 of the terminal, with the outer insulation sheath 52 in adjacent spaced relationship from the end 32 of the terminal.

A first crimping die, a portion of which is shown at 54, includes a generally segmented cylindrical crimping surface 56 located at the bottom of a die nest 58. The corresponding cooperating die, a portion of which is shown at 60, includes a generally recessed segmented cylindrical portion 62 adjacent to a partially recessed planar crimping surface 64. A generally inclined frustoconical crimping surface 66 provides a transition crimping portion between the recessed planar crimp portion 64 and the more deeply recessed cylindrical portion 62. A relatively projecting rectangular crimp surface 68 is adjacent to the recessed planar crimp surface 64 and is completely bounded by inclined sidewalls, one of which is shown at 70, which sidewalls provide stress relief for the crimp and other advantages to be described hereinafter. Generally centrally of the projecting surface 68 is a shallow reduced diameter recess 72 provided with a reduced dimension conical recess.

With reference to FIG. 11, the details of the crimping operation will be explained. The terminal 14, together with the assembled insert 34, ring 46 and aluminum conductor wire is inserted between the cooperating dies as shown in FIG. 11, with the cylindrical surface 24 of the terminal received against the segmented cylindrical surface 56 of the die 54. Upon initiation of the crimp, the projecting rectangular crimping surface 68 initially will engage against and indent into the wire barrel 14. Such action initially radially compresses together the wire barrel 14, the insert 34 and the conductor strands 48, thereby building up reaction pressure in opposition to the crimping action of the surface 68. As the dies 54 and 60 are progressively compressed toward one another in crimping relationship, such reaction pressure correspondingly increases which causes a portion of the wire barrel 14 to extrude into the recess 72 of the die 60. Such extrusion forms a projecting button having a projecting spike, shown at 74 in FIG. 13 in the completed termination. The presence of the button and spike 74 indicates that the wire strands 48 have been inserted sufficiently into the terminal wire barrel 14. If either the button or the spike is absent from the completed termination, or if the button fails to achieve a cylindrical configuration complimentary to the die recess 72, this is an indication that the wire strands 48 have not been sufficiently inserted within the wire barrel 14. The strands would not accordingly completely fill the insert 34 during indentation by the rectangular crimp surface 68. Thus, the reaction forces produced by the radially compressed terminal, insert and wire strands would be insufficient to produce the required extrusion of the terminal and provide the desired configuration of the button and spike 74.

As more particularly illustrated in FIGS. 11 and 12, crimping dies 54 and 60 are progressively compressed together until the remaining crimping surfaces 64, 66 and 62 are brought into compressed relationship over the assembled terminal and conductor. As shown in FIG. 12, the dies 54 and 60 are shown at full completion of the crimping operation with the cylindrical crimping surface 62 overlying and radially compressing the wire barrel upon the insulation sheath 50, the frusto-conical crimping surface 66 generally overlying in compressed relationship the transition between the cylindrical inner portions 26 and 30 of the terminal, and the rectangular crimping surface 68 forming a relatively deeply recessed or depressed crimp portion and in compressed relationship over the assembled terminal, insert and wire strands.

As shown in FIG. 12, the terminal wire barrel 14 has been extruded from the dies 54 and 60 due to the relatively deeply deformed crimp portion. The strands 48 also have been extruded together with the terminal to protrude from the dies. The strands are additionally extruded to generally fill the reservoir 28 which has been purposely provided to receive the extruded portions of the strands in order to prevent extrusion pressures forcing the strands externally of the end 32 of the wire barrel and result in consequent escape of the strands from the wire barrel during termination. The inclined surface 70 of the die, in addition to providing a stress relief immediately adjacent to the relatively deeply recessed crimp provided by the crimping surface 68, spaces the crimp surface 68 from the edge of the die 60 and insures that such crimp is located in longitudinal spaced relationship from the reservoir 28. During the crimping operation, and due to such spacing, the surface 70 applys crimping pressure in a direction which forcibly extrudes the wire strands into the reservoir. FIG. 12 additionally illustrates a relative dimension defined as the total length of the terminal before crimping and another dimension representing the total length of the terminal after crimping. Ideally, the crimping operation produces extruded elongation of the terminal in the range of 20–25 percent of its original length, with the corresponding same percentage of extruded elongation of the strands 48. Additionally, it is desirable that elongation of both the terminal and wire strands become concentrated at the vicinity of the relatively deeply recessed crimp provided by the rectangular crimping surface 68. Such correspondence in extrusion is assured since upon initiation of the crimp, the terminal, insert and wire strands are radially compressed together, with the perforations of the insert receiving extruded portions of both the terminal and wire strands in tightly mechanically gripped relationship. Thus upon application of progressively increased crimping forces, the gripped terminal and wire strands will extrude together and produce the completed crimp shown in FIG. 12.

Figure 14:
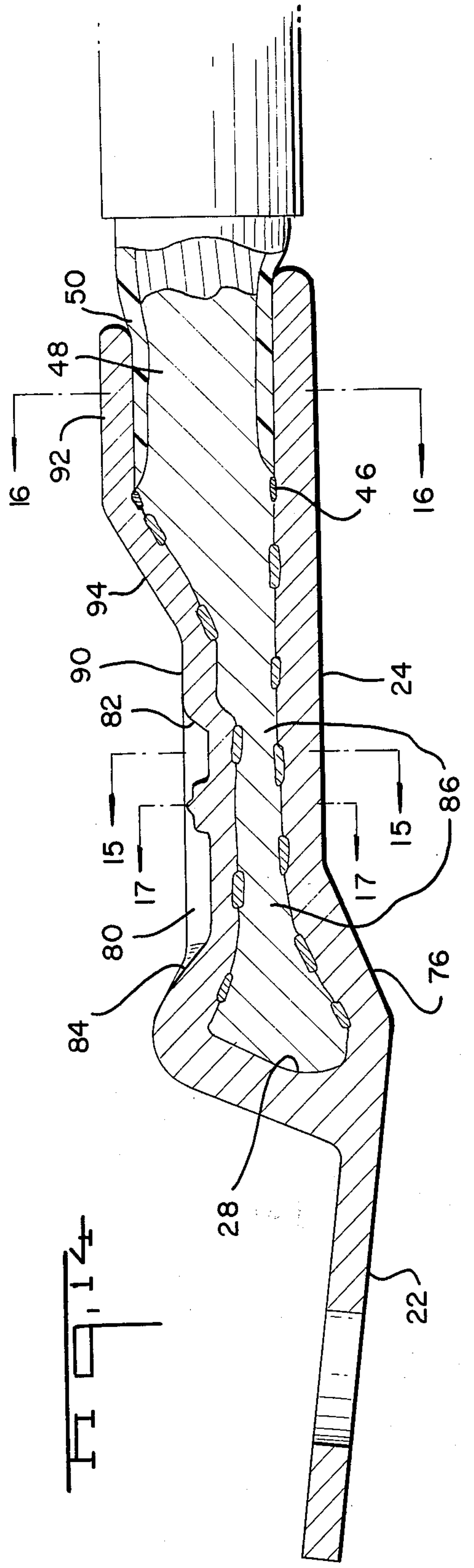
FIG. 14 is an enlarged longitudinal section of the termination illustrated in FIG. 13.
Figure 17:
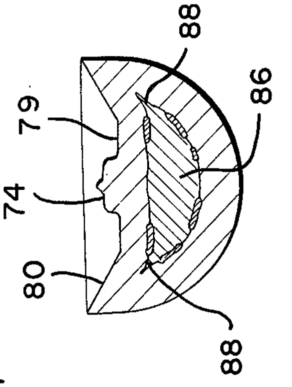
FIG. 17 is an enlarged detailed section taken generally along the line 17—17 of FIG. 14.

With reference to FIG. 13, taken in conjunction with FIGS. 14 through 17, the completed termination will be described in detail. The termination is characterized by an arcuate transition surface 76 disposed integrally with the planar surface 22 and the segmented cylindrical surface 24 of the terminal. During extrusion, the surface 76 is formed simultaneously as the surface 22 is deformed out of tangential relationship with respect to the surface 24. Upon inspection of the termination, the arcuate surface 76 appears highly polished in appearance occasioned by the wiping action of the arcuate surface 78 of the die, shown in FIG. 12, as the terminal and wire strands 48 are extruded longitudinally. The surface 68 of the die 60 produces a generally rectangular relatively deeply recessed crimp portion 79 bounded by inclined sidewalls, three of which are shown at 80, 82 and 84. The inclined sidewall 84 appears to have a highly polished appearance occasioned by the wiping action of the inclined surface 70 of the die 60 during longitudinal extrusion of the terminal and wire strands during the crimping operation. As shown in FIG. 14, the portion 86 of the extruded strands 40, which underlie the rectangular crimped portion 79, experiences a total reduction in area in the range of 57 percent to 63 percent of the original area. Such reduction in area is occasioned by the purposeful longutudinal extrusion of the wire strands 48 concentrated at the vicinity of the crimped portion 79. Since aluminum creeps readily when subjected to crimping forces, such reduction in area is readily converted into extrusion of the strands. Such extrusion is necessary for exposing unoxidized portions of the strands enabling intimate mechanical and electrical contact within the termination. More specifically, the aluminum strands are readily deformed inelastically, whereas the observed everpresent oxide coatings on the aluminum strands are relatively brittle and do not readily deform inelastically. Thus, the relatively severe extrusion produced by the crimping operation advantageously creates inelastic deformation and surface migration of the aluminum strands thereby fracturing the brittle oxides into separate particles and separating the particles during the surface migration thereby exposing unoxidized surfaces of the wire strands. The separated particles create oxide inclusions subtracting from the obtainable electrical contact, but the oxide free surfaces of the strands extrude through the perforations of the insert and engage in intimate mechanical and electrical contact with the correspondingly extruded wire barrel.

As shown in FIG. 14, the insert itself longitudinally elongates during the crimping operation, thus increasing the size of the perforations 36 and allowing progressively larger masses of oxide free wire strands to extrude through the expanding perforations and engage in electrical contact with the terminal. Additionally, as shown with reference to FIGS. 15 and 17, the inclined sidewalls 80 adjacent to the relatively deeply recessed crimp portion 79, produce laterally directed crimping forces forcing certain strands to plastically deform into longitudinal crevices 88 formed longitudinally of the wire barrel during crimping. Thus the wire strands extrude laterally as well as longitudinally in electrical contact with the terminal. The strand portions 86 in the vicinity of the relatively deeply recessed crimp portion 79 have an elongated and drawn appearance with oxide inclusions being substantially isolated and separated by oxide free strand surface portions. Some oxide free surfaces which are not in electrical contact with the terminal, are in contact with adjacent strands providing intimate mechanical and electrical contact therebetween. More importantly, due to the deeply deformed crimping, the oxide free surfaces of adjacent strands are rubbed and cold welded together, further improving the electrical contact between the strands.

A planar crimp portion 90 is provided adjacent to the inclined sidewall crimp portion 82 providing a transition and stress relief between the crimps 79 and 90. The crimp portion 90 creates a reduction in cross section of the terminal and wire strands in the range of 45 to 50 percent. The crimp portion 90 provides a gradual transition internally of the wire barrel of extruded strand portions to unextruded strand portions. This eliminates tearing of the strands during the crimping operation due to an abrupt interface of extruded and unextruded strand material. The crimp portion 90 also insures that portions of the wire strands, as well as portions of the terminal, are extruded into the perforations of the insert to provide radially compressed mechanical gripping forces immediately adjacent to the extruded portions of the terminal and strands, which become relatively weak in mehcanical strength due to the experienced extrusion.

Figure 16:
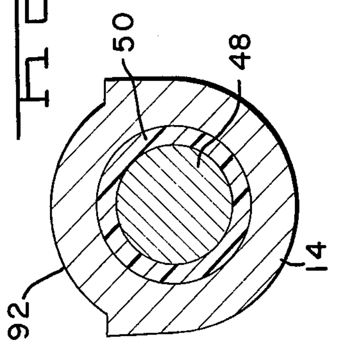
FIG. 16 is an enlarged detailed section taken generally along the line 16—16 of FIG. 14.
Figure 15:
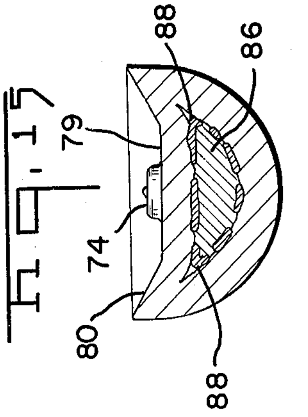
FIG. 15 is an enlarged cross section taken generally along the line 15—15 of FIG. 14.

Adjacent the end of the terminal is provided a segmented cylindrical crimp portion 92 overlying and providing radially compressed gripping forces on the strands 48 and the surrounding environment impervious sheath 50. The crimp portion 92 produces a reduction in area of approximately 5 percent compressing the terminal 14, the sheath 50 and the strands 48 in intimate sealing relationship. As shown in FIG. 16, the strands 48 in the vicinity of the crimp portion 92 are in compressed relationship, providing residual reaction pressure resisting the compressive crimp forces, and additionally providing mechanical support at the end of the terminal for resisting vibration and twisting forces tending to destroy the sealing relationship. A frusto-conical crimp portion 94 provides a transition of progressively reduced radially compressive forces between the crimp portions 90 and 92. Such transition prevents tearing of the terminal and of the wire strands at the transition between the crimp portions 90 and 92. Additionally, the crimp portion 94 provides radially inwardly compressive forces forcing the perforated insert to bite into both the terminal and the wire strands, thereby mechanically interlocking the wire strands with the terminal and providing resistance to tensile forces tending to separate the wire and the terminal. As shown in FIG. 14, the ring 46 is embedded into the wire strands in the vicinity of the crimp portion 94.

Figure 8:
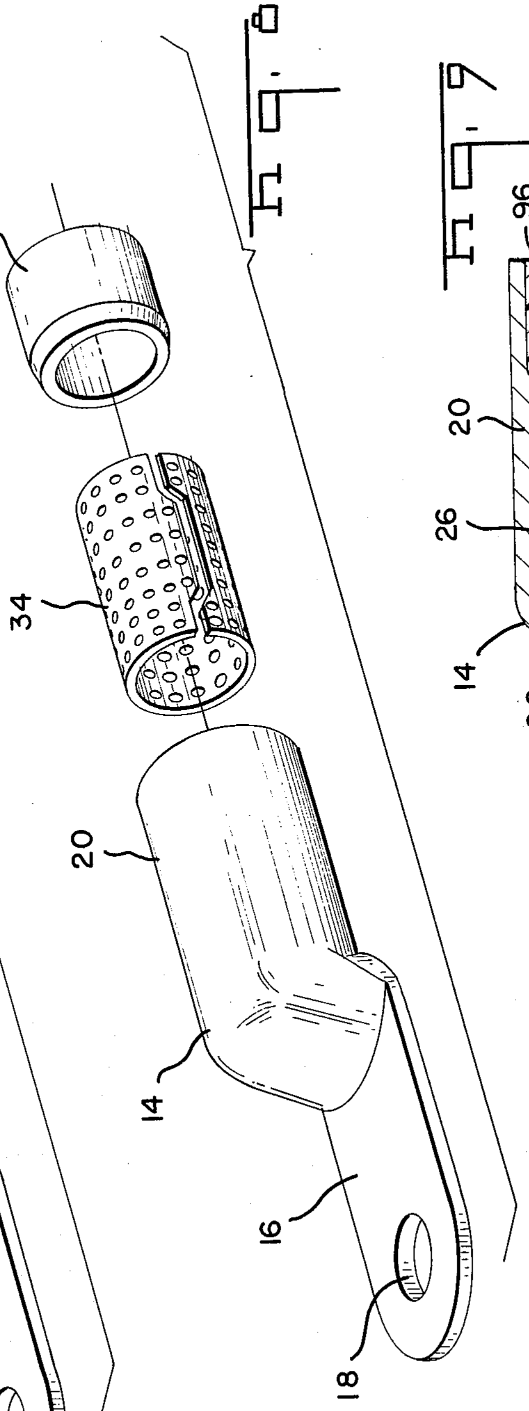
FIG. 8 is an enlarged, exploded perspective illustrating in detail a modification of the preferred embodiment shown in FIG. 7.
Figure 9:
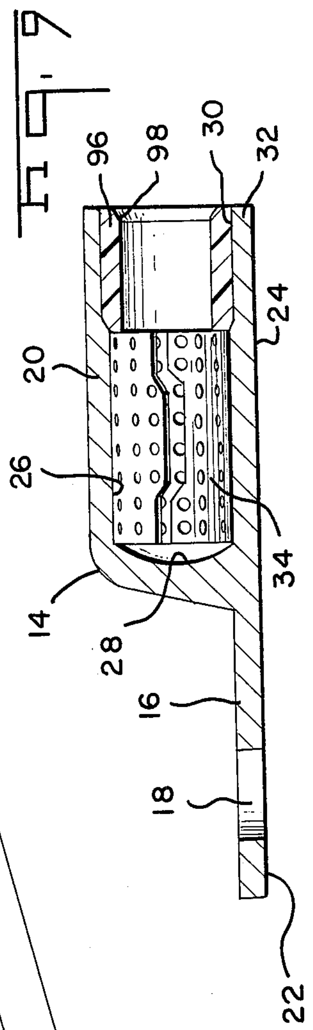
FIG. 9 is a detailed section of the embodiment shown in FIG. 8 with parts assembled.

With reference being made to FIGS. 8 and 9, a modification of the terminal shown in FIG. 7 will be described in detail. On many occasions, it is often desired to terminate aluminum stranded conductors which do not have an environment impervious sheath such as the sheath 50. In such case, an elastomeric generally cylindrical seal 96 is substituted for the ring 46 of the embodiment shown in FIG. 7. The seal 96 is inserted within and extends the entire length of the inner cylindrical portion 30 of the terminal. An internal annular chamfer 98 is provided on the seal 96 providing a funnel shaped lead in surface for gathering the strands of an aluminum wire when inserted in the terminal. It will be understood that exposed strand end portions of the wire are received in the perforated insert 34 and that a portion of the wire insulation sheath is received internally of the seal 96, such that when crimped, the seal 96 will be readily compressed in sealing engagement upon the insulation of the wire.

Other embodiments and modifications of the present invention will become apparent from the spirit and scope of the appended claims.

What is claimed is:

1. A crimped, corrosion-proof terminal connection, comprising: a terminal having a wire barrel portion, an insert within said wire barrel portion, an aluminum wire having an end portion received within said insert, with said wire barrel portion, said insert and said aluminum wire end portion being crimped together with a relatively deeply depressed forward crimped portion and an immediately adjacent relatively less deeply depressed rearward crimp portion, said deeply depressed crimp portion including a projecting portion formed by an extruded portion of said wire barrel, said insert being provided with a plurality of perforations to accept therein extruded portions of said wire and of said terminal, said terminal including portions extruded into said insert perforations at said relatively deeply depressed crimp portion, said wire at said deeply depressed crimp portion including portions extruded into said perforations of said insert and in electrical contact with said extruded portions of said terminal, said wire extruded portions having an oxide layer thereon being purposely broken upon extrusion at said relatively deeply depressed crimp portion to establish the electrical contact with said terminal, said terminal and said insert and said wire in intimate contact thereby preventing reoxidation of said wire extruded portions and thereby preventing corrosion internally of said connection, a reservoir internally of said wire barrel portion forwardly of said insert, said deeply depressed forward crimp portion being substantially elongated in a forward direction during crimping and said wire conductor being longitudinally extruded within said elongated forward crimp portion and substantially filling both said elongated forward crimp portion and said reservoir.

2. The structure as recited in claim 1, wherein said projecting portion includes a projecting button and a spike formed by extrusion of said terminal at said deeply depressed crimp portion.

3. A crimped, corrosion-proof electrical terminal connection progressively reduced in diameter in a stepwise fashion resulting in a stepped crimp, the combination comprising:

a terminal having a wire barrel portion, an insert received in said wire barrel portion, an aluminum wire, sealing means covering said aluminum wire and protecting said aluminum wire from corrosion, said aluminum wire having an end portion protruding from said sealing means and received internally of said wire barrel portion and said insert, said wire barrel portion, said insert and said aluminum wire end portion being crimped together upon application of crimping forces with a relatively deeply depressed first forward crimp portion and an immediately adjacent relatively less deeply depressed second rearward crimp portion, said wire barrel portion at least partially receiving said sealing means therein together with said wire end portion, said wire barrel portion, said sealing means and said wire end portion being crimped together upon application of crimping forces and providing a third portion adjacent to said relatively less deeply depressed second crimp portion and rearward thereof with said sealing means in compressed sealing relationship between said wire barrel portion and said wire end portion, said wire end portion being in compressed relationship at said third crimp portion and providing residual reaction pressure resisting crimping forces producing said third crimp portion, and providing mechanical support at an end of said terminal for resisting vibration and twisting forces tending to destroy said sealing relationship, said insert being provided with a plurality of perforations sufficiently large to accept therein extruded portions of said wire in said terminal, said terminal including substantially extruded portions extruded into said insert perforations at said first crimp portion, said wire at said first crimp portion including substantially extruded portions extruded into said perforations of said insert and in electrical contact with said extruded portions of said terminal, said second crimp portion providing said terminal and said insert and said wire in mechanical locked engagement resisting separation of said wire from said terminal, said wire substantially extruded portions having an oxide layer thereon purposely fractured into separated particles with unoxidized surfaces of said wire extruded portions being exposed and extruded into said perforations of said insert and in electrical contact with said extruded portions of said terminal, a reservoir internally of said wire barrel portion forwardly of said insert, said first crimp portion being substantially elongated in a forward direction during crimping and said wire conductor being longitudinally extruded within said elongated first forward crimp portion and substantially filling both said first crimp portion and said reservoir.

4. The structure as recited in claim 3, wherein, said sealing means comprises a sheath of electrical insulation material covering said aluminum wire.

5. The structure as recited in claim 3, wherein, said sealing means comprises a cylindrical seal of insulation material encircling said aluminum wire.

6. The structure as recited in claim 3, wherein, said aluminum wire at said first crimp portion having a reduction in cross-section in the range of 57 to 63 percent, and said wire at said second crimp portion having a reduction in cross-section in the range of 45 to 50 percent.

7. The structure as recited in claim 6, and further including: a transition crimp portion in the form of an inclined sidewall configuration located on said terminal between said first crimp portion and said second crimp portion, said transition crimp portion providing strain relief of said terminal between said first and said second crimp portion.

8. The structure as recited in claim 6, wherein, said wire at said third crimp portion includes a reduction in cross-section of about 5 percent, and further including: a frusto-conical crimp portion located between said second and said third crimp portions and providing a transition of progressively reduced radially compressive forces between said second and third crimp portions to prevent tearing of said terminal and of said aluminum wire at the transition between said second and said third crimp portions.

9. The structure as recited in claim 3, wherein, said second crimp portion provides means defining a gradual transition internally of said wire barrel of extruded wire portions to unextruded wire portions, thereby eliminating tearing of said wire and an abrupt interface of extruded to unextruded wire.

10. The structure as recited in claim 3, wherein said wire barrel portion includes a sealably closed end configuration forming said reservoir internally thereof.

11. The structure as recited in claim 3, wherein, said first crimp portion is bounded by a plurality of adjacent inclined sidewall crimp portions providing strain relief for said terminal at said relatively deeply depressed crimp portion.

12. The structure as recited in claim 10, wherein, said first crimp portion is bounded by a plurality of adjacent inclined sidewall crimp portions providing strain relief for said terminal at said relatively deeply depressed crimp portion, with at least one of said inclined sidewall crimp portions being located adjacent said sealably closed end configuration of said tubular portion and producing crimping forces longitudinally of said wire tending to urge said wire into said reservoir.

13. The structure as recited in claim 3, wherein, said aluminum wire is comprised of a plurality of strands longitudinally extruded at said first crimp portion, with an oxide layer on each strand being purposely fractured into separated particles and with oxide free surfaces of said strands being exposed and extruded into said perforations of said insert and into electrical contact with said extruded portions of said terminal.

14. The structure as recited in claim 10, wherein, said sealably closed end of said wire barrel portion is provided with a convex inner portion defining said reservoir.

15. The structure as recited in claim 14, wherein, said first crimp portion is bounded by an adjacent inclined sidewall crimp portion which spaces said first crimp portion in longitudinal spaced relationship from said closed end wire barrel portion containing said reservoir, said adjacent inclined sidewall crimp portion providing strain relief of said terminal and producing crimp forces tending to urge said aluminum wire into said reservoir.

16. The structure as recited in claim 3, and further including: a generally planar surface provided on at least a portion of said terminal at said first crimp portion, a button and a projecting spike formed from an extruded portion of said terminal and protruding from said generally planar surface, said first crimp portion producing radial compression on said wire barrel portion and on said insert and on said aluminum wire, the presence of said aluminum wire at said first crimp portion forming reaction pressure in opposition to said radial compression, and said reaction pressure being sufficient to form said button and said spike from said terminal extruded portion.

17. The structure as recited in claim 3, wherein, said terminal, said insert and said wire are radially compressed together into mechanically gripped relationship, and with said terminal, said insert and said wire in mechanically gripped relationship being together extruded longitudinally upon application of said crimping forces at said first crimp portion.

18. The structure as recited in claim 17, wherein, said insert is progressively elongated upon application of said crimping forces at said first crimp portion, with said perforations of said insert expanding in size upon elongation of said insert, and with progressively increased masses of oxide free portions of said wire being extruded into said expanding perforations and also into electrical contact with said extruded portions of said terminal.

19. The structure as recited in claim 17, wherein, said insert is elongated upon application of said crimping forces, said perforations of said insert being expanded in size upon elongation of said insert, and said oxide free portions of said wire are extruded into said perforations and also electrically contacting said extruded portions of said terminal.

20. The structure as recited in claim 3, wherein, said first crimp portion produces longitudinal crevices in said wire barrel portion, said first crimp portion includes a plurality of inclined sidewall crimp portions, each of said inclined sidewall crimp portions extruding said aluminum wire laterally of the longitudinal axis of said aluminum wire and into a corresponding crevice and also into electrical contact with said terminal.

21. The structure as recited in claim 3, wherein said insert is electrically conductive and of a tensile strength greater than aluminum.

* * * * *

UNITED STATES PATENT OFFICE

CERTIFICATE OF CORRECTION

PATENT NO. : 3,955,044

DATED : May 4, 1976

INVENTOR(S) : RONALD CLARENCE HOFFMAN ET AL

It is certified that error appears in the above-identified patent and that said Letters Patent are hereby corrected as shown below:

Column 10, Claim 3, line 31, after "third" insert ---crimp---.

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*